United States Patent

[11] 3,620,596

| [72] | Inventor | Gerald F. Binnings<br>Arcadia, Calif. |
|---|---|---|
| [21] | Appl No. | 73,654 |
| [22] | Filed | Sept. 18, 1970 |
| [45] | Patented | Nov. 16, 1971 |
| [73] | Assignee | Aerojet-General Corporation<br>El Monte, Calif.<br>Continuation of application Ser. No.<br>732,341, May 27, 1968, now abandoned.<br>This application Sept. 18, 1970, Ser. No.<br>73,654 |

[54] MICROSCOPE SLIDES
5 Claims, 8 Drawing Figs.

[52] U.S. Cl. ............................................. 350/95,
350/87
[51] Int. Cl. ..................................... G02b 21/34
[50] Field of Search............................. 350/92–95,
86, 87

[56] References Cited
UNITED STATES PATENTS

| 1,836,915 | 12/1931 | George | 350/95 |
|---|---|---|---|
| 2,698,554 | 1/1955 | Bauersfeld | 350/86 |
| 2,780,135 | 2/1957 | Chandler | 350/86 x |
| 3,031,924 | 5/1962 | Lamal | 350/95 |
| 3,328,502 | 6/1967 | Robson | 350/95 X |
| 1,002,910 | 9/1911 | Foote | 350/95 X |

FOREIGN PATENTS

| 551,450 | 1/1958 | Canada | 350/95 |
|---|---|---|---|
| 642,659 | 3/1937 | Germany | 350/86 |
| 669,751 | 1/1939 | Germany | 350/86 |
| 555,685 | 1/1957 | Italy | 350/86 |

Primary Examiner—David H. Rubin
Attorneys—Edward O. Ansell and D. Gordon Angus

ABSTRACT: This disclosure relates to microscope slides for use in microscopes such as dark-field microscopes.

A microscope slide according to the present disclosure comprises a generally flat elongated body having a lower surface. A recess is provided in the lower surface and a cover glass is located in the recess. The lower surface of the cover glass is adapted to support a specimen to be examined. The lower surface is also adapted to be positioned in the reference plane of the microscope so that the focal plane defined by the microscope is coincident with the reference plane.

PATENTED NOV 16 1971

INVENTOR.
GERALD F. BINNINGS
BY
ATTORNEY

MICROSCOPE SLIDES

This application is a continuation of application Ser. No. 732,341 filed May 27, 1968 and now abandoned.

This invention relates to microscope slides for use in microscopes, and particularly for dark-field microscopes.

Basically, a dark-field microscope includes a base supporting a stage for supporting a microscope slide. A substage lens is located below the stage for focusing radiation, such as light, on a focal plane above the stage, and an objective lens is provided above the microscope stage for focusing upon the focal plane so that an image of a specimen on the focal plane will be transmitted to an eye piece for viewing.

Many biological and medical diagnostic tests are performed by means of dark-field microscopes. Heretofore, a specimen of the material to be examined has been placed on a glass slide and a drop of immersion fluid was placed over the specimen. A cover glass was placed over the specimen and pressed against the lower glass slide. The cover glass was ordinarily constructed of the same material as the lower slide. The assembled slides, together with the specimen sandwiched between them, were placed upon the stage of the microscope and a drop of immersion fluid was placed between the substage lens and the lower slide. The immersion fluid between the slides provided an interface between the slides, and the immersion fluid between the lower slide and the substage lens provided a second interface between the lower slide and the substage lens. Ordinarily, the immersion fluid had an index of refraction closely approximating that of the glass slides and the material of the construction of the substage lens. The lenses of the microscope were focused on the interface between the two slides and thereby defined the focal plane of the microscope in which the specimen was located. The focal plane was located a distance from the reference plane defined by the stage, which distance was determined by the thickness of the lower slide. Light was transmitted from the substage lens through the lower slide and onto the focal plane, and the objective lens was focused through the cover plate onto the focal plane to project an image of the specimen to an eyepiece for viewing purposes.

It became necessary to readjust the microscope for each examination of specimens on different slides. The reason that such readjustment was required was that the thickness of glass slides varied from slide to slide and accurate location of the focal plane defined by the upper surface of the glass slide could not be accurately maintained from one slide assembly to the other. Variations in the thickness of the lower slide caused variations in the location of the specimens to be examined relative to the reference plane defined by the stage. Since the focal length of the objective lens is usually relatively short, for example 0.22 millimeters, and since the thickness of the cover plate had to be less than the focal length of the objective lens, the cover plate was fragile and frequently fractured when handled, thereby causing injury to the technician and necessitating frequent replacement.

It is an object of the present invention to provide a microscope slide capable of accurately locating a focal plane so that a microscope will not require readjustment as specimens on different slides are examined.

Another object of the present invention is to provide a microscope slide for holding a specimen on a focal plane, which slide may be placed on a stage of a microscope in an operative examining position in less time than heretofore accomplished.

Still another object of the present invention is to provide a microscope slide having a specimen carrier of minimal thickness carried by a rubber support structure in a manner whereby distortions or bending of the support structure will neither interfere with the focus or produce fracturing of the thin specimen carrier.

A microscope slide according to the present invention comprises a generally flat elongated body having a lower surface. A recess is located in the lower surface which contains a transparent cover plate. The lower surface of the cover plate is adapted to support a specimen, and a passage is provided between the upper surface of the elongated body and the upper surface of the cover plate to permit access of the objective lens of the microscope to close proximity with the upper surface of the cover plate.

In the use of the microscope slide according to the present invention, a specimen is placed on the lower surface of the cover plate and the slide is positioned on a microscope such as the stage of the microscope. Preferably, locating means is provided on the microscope which positions the plane of the lower surface of the cover plate with respect to the substage lens. An immersion fluid is placed between the specimen on the lower surface of the cover plate and the substage lens of the microscope. The immersion fluid forms an interface between the substage lens and the specimen, and the index of refraction of the fluid closely approximates that of the substage lens. The objective lens is positioned in the passage above the cover plate and is focused upon the focal plane defined by the lower surface of the cover plate to project an image of the specimen on the cover plate to an eye piece.

A feature of the present invention resides in the fact that the objective lens and the substage lens may be focused on the lower plane of the cover plate, whose location may be determined by the stage or the locating means. Thus, when slides are changed, the focal planes do not change significantly and the microscope does not require readjustment.

Another feature of the present invention resides in the fact that only one application of immersion fluid need be applied to the cover plate during an examining operation, thereby decreasing the time required in placing a microscope slide on a stage of a microscope for examining purposes.

Another feature of the present invention involves the design of the microscope slide wherein a thin specimen carrier is fixed to a slide by a stress free connection.

The above and other features of the present invention will be more fully understood from the following detailed description and the accompanying drawings, in which:

FIG. 1 H is a perspective bottom view of a disassembled microscope slide in accordance with the preferred embodiment of the present invention;

Figure 6:
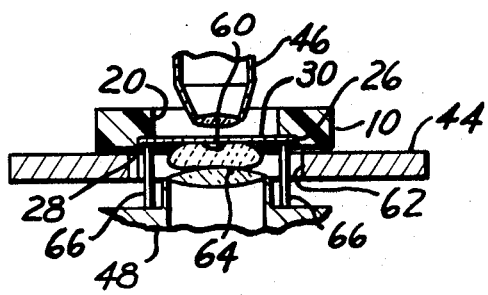
FIG. 6 is a partial side view in cutaway cross section of a microscope having a microscope slide in accordance with the present invention supported on a stage thereof.
Figure 7:
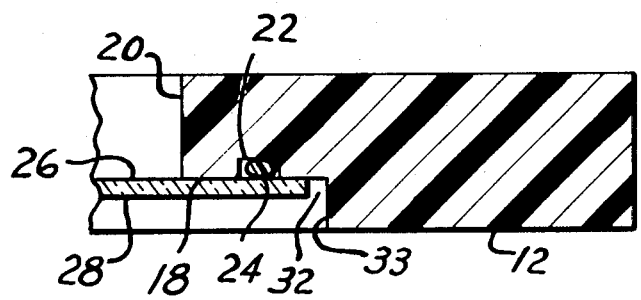
Figure 8:
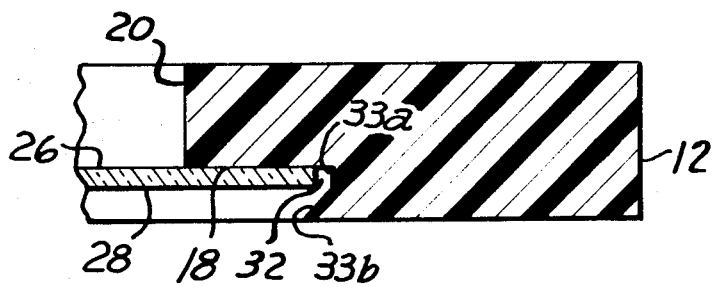

FIG. 7 is an enlarged fragmentary section of the slide illustrated in FIGS. 1-4 and 6 showing the details of assembly; and FIG. 8 is a fragmentary section of the microscope slide illustrated in FIGS. 1-4, 6 and 7 with an alternate securing method for the specimen carrier. X FIGS. 1-4 illustrate a microscope slide 10 in accordance with the presently preferred embodiment of the present invention. Slide 10 comprises a generally flat elongated body 12 having a lower surface 14 and an upper surface 16. Body 12, which may be constructed of a suitable opaque plastic, is preferably rectangular in shape and includes a recessed portion 18 in lower surface 14. The thickness of body 12 is typically of the order of about one-sixteenth inch, but it is to be understood that the thickness of body 12 may be varied in accordance with the particular application. A passage 20 provides communication between recessed portion 18 and upper surface 16 of body 12. Recessed portion 18 includes counterbores 22 adapted to receive a suitable bonding agent 24 for fixedly mounting cover plate 26 within the recessed portion 18.

Figure 1:
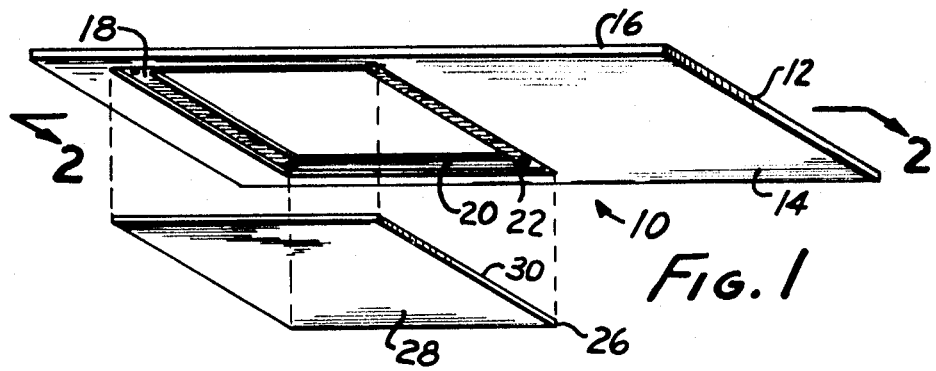
Figure 2:
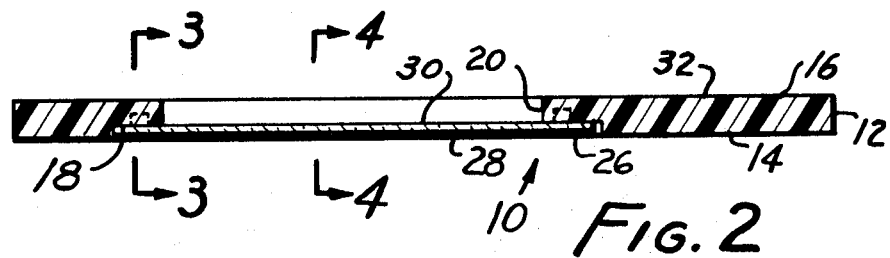
FIG. 2 is a section view of the microscope slide illustrated in FIG. 1 taken at line 2—2 in FIG. 1.
Figure 3:
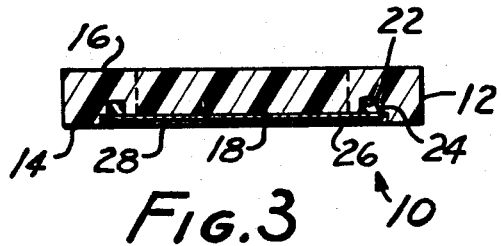
FIG. 3 is a section view of the microscope slide illustrated in FIGS. 1 and 2 taken at line 3—3 in FIG. 2.
Figure 4:
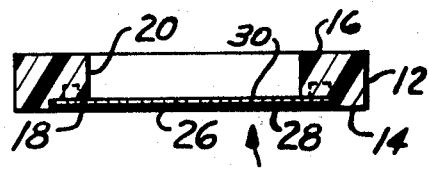
FIG. 4 is a section view of the microscope slide illustrated in FIGS. 1-3 taken at line 4—4 in FIG. 2.

Cover plate 26 is preferably constructed of suitable glass and preferably has a thickness of less than 0.22 millimeters between its lower surface 28 and its upper surface 30. Typically, the cover plate will have a thickness between about 0.15 and 0.20 millimeters. As will be more fully understood hereinafter, lower surface 28 defines a focal plane upon which the objective and substage lenses of a microscope may be focused. Lower surface 28 also provides a supporting surface upon which a specimen to be examined may be placed. Surface 28 preferably is accurately planar, so that the reference plane and focal plane defined by surface 28 are accurately maintained. If desired, cover plate 26 may be offset to one end of the microscope slide 10 so that identifying indicia (not shown) may be printed or embedded onto portion 32 of upper surface 16 (FIGS. 1 and 2). Alternatively, the specimen supporting portion of the microscope slide may be centrally located as illustrated in FIGS. 5 and 6.

Figure 5:
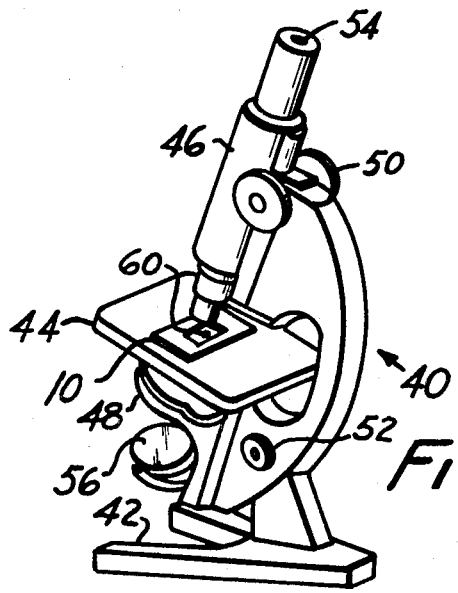
FIG. 5 is a perspective view of the microscope having a microscope slide in accordance with the present invention supported on a stage of the microscope.

Referring to FIGS. 5 and 6, the operation of the microscope slide in accordance with the present invention may be explained. In FIGS. 5 and 6 there is illustrated a microscope 40 having a base 42. Base 42 supports stage 44, objective lens 46 above the stage, and substage lens 48 below the stage. Adjustment means 50 is provided for adjusting the focal point of objective lens 46 and adjustment means 52 is provided for adjusting the focal point of substage lens 48. Objective lens 46 includes an eye piece 54 through which a viewer may observe an image of a specimen. If desired, a mirror or other light projecting device 56 may be provided below the substage lens 48 to transmit light to the substage lens.

Specimen 60 is placed on lower surface 28 of glass cover plate 26 and adheres to that surface. Stage 44 includes a passage 62 and substage lens 48 is located within passage 62 within a few microns of surface 28 of cover plate 16. Immersion fluid 64 is placed between cover plate 26 and substage lens 48 within the passage 62 to provide an interface which closely approximates the index of refraction of the substage lens and the cover plate. By way of example, immersion fluid 64 may be glycerol or other suitable substance. Preferably, three or more locating pins 66 are provided for abutment against surface 28 of cover plate 26 for supporting slide 10.

Microscopes utilize a reference plane for supporting microscope slides. Ordinarily, the reference plane is defined by the stage. However, with a slide according to the present invention, it is preferred that the microscope be equipped with locating pins 66 which are adapted to contact and locate surface 28 of cover plate 26. Preferably, there are at least three of such pins so as to accurately define the focal plane with reference to the microscope lenses. Heretofore, the focal plane defined by the microscope slide has been located some distance from the reference plane as determined by the thickness of the microscope slide. Variances in the thickness of microscope slides cause changes in the location of the focal plane with respect to the reference plane. Since the lenses of the microscope are adjusted to focus on a plane referenced to the reference plane, variations in thickness of microscope slides cause changes in the locations of the associated focal planes, thereby requiring refocusing the lenses for each slide. With a microscope slide according to the present invention, the focal plane and the reference plane are maintained coincident so that the focal plane is maintained in the same position and the microscope does not have to be readjusted for each microscope slide.

This coincidence of focal and reference planes is in part achieved by a novel arrangement of the novel structural arrangement of the microscope slide which is illustrated more clearly in FIGS. 7 and 8. FIG. 7 is a greatly enlarged view illustrating the details of attachment of the glass slip or slide cover 26 to the body 12. It should be noted that the body 12 includes a recess 18 in which the glass cover 26 rests and has a number of depressions or bores 22 in the recess surface. Contained within each bore is a quantity of nonhardening cement 24 of sufficient volume to largely fill the bore and to provide adherence between the glass cover plate 26 and the body 12. Cement spots 24 provide sufficient adherence for assembling the glass cover to slide body 12. It should also be noted that there is a clearance region 32 between the edge of the glass cover plate 26 and the wall 33 of the recess. This clearance and the particular mode of attachment of the glass cover plate are significant since the slide is particularly adapted for mechanical handling wherein the body will, on occasion, be subjected to bending or torsional stress which, if transmitted to the glass cover plate, can cause its fracture or at least deformation from a plane. Such fracturing or deformation would ordinarily interfere with proper viewing in the microscope as hereinafter described. The glass cover plate positioned on recess surface 18 and adhering to body 12 at several locations provides a degree of freedom of movement by the noncompatible cement such that minor deformation of the body will permit the cover plate to move slightly off recess surface 18 while remaining adherent thereto by the nonhardening cement. If the slide body is distorted, one or more of the adherent spots of cement becomes stretched or even temporarily separated from the glass cover, thereby permitting the cover plate to stand partially free of the surface 18 without distortion or fracture. Upon removal of the distortion or stress on the body 12, cover plate 26 returns to its normal position in the recess and the cement reunites the cover plate to the surface 18. It can therefore be understood that cover plate 26 is not distorted or fractured even if slide body 12 is subjected to severe abuse. It has been found where the body 12 is formed from nylon or similar polyamide material and cover plate 26 of glass, a particularly useful bonding agent or cement is a rubber base cement such as the 9DDX-7A pressure sensitive rubber base cement, commercially available from Industrial Rubber Cement Company, City of Industry, Cal.

It should be recognized that any nonhardening, nonstress transmitting cement which adheres to both glass and the nylon body material might be used in this application.

Under certain circumstances and in the interest of reduced cost of manufacture, use of nonglued glass cover plates may be desired. In FIG. 8 there is illustrated an alternate mode of attachment of cover plate 26 to body 12. In FIG. 8 recess 18 of the body includes a surface without bores and wall 33 includes a perpendicular portion 33a and an inclined overhanging portion 33b. Portion 33b serves as a retainer for cover plate 26. As illustrated in FIG. 8, a clearance region 32 is maintained between the edge of the cover plate and the wall. The cover plate is inserted into the body 12 by slightly bending the body to permit the cover plate to be assembled into the recess. Although the arrangement illustrated in FIG. 8 allows some relative movement between cover plate 26 and body 12, such movement will not interfere with the normal use of the slide. The arrangements illustrated in FIGS. 7 and 8 are advantageous as may be understood by reference to FIGS. 5 and 6, wherein the microscope slide is referenced for viewing with respect to surface 28 of cover plate 26 and not by reference to the slide body.

In operation, the reference plane upon which the lenses may be focused is defined by lower surface 28 of the cover plate. Surface 28 also provides support for specimen 60. The location of surface 28 of the cover plate is preferably determined by locating pins 66 which preferably protrude slightly above the upper surface of stage 44 so that slides 10 may be successively positioned for examination without dislodging the respective specimen from the lower surface of the cover plate. Thus, after the lenses have been focused upon the reference plane defined by one microscope slide and located by pins 66, focal planes of successive microscope slides are automatically positioned on the reference plane so that the microscope need not be readjusted.

It is to be understood that it is not necessary to maintain surface 28 of the cover glass flush with surface 14 of the slide body. Thus, as illustrated in the drawings, cover plate 26 may be recessed from surface 14.

The present invention is particularly useful where a microscope is provided with an automatic feed mechanism for automatically feeding microscope slides onto the stage of a microscope and for automatically inserting immersion fluid between the substage lens and the lower surface of the microscope slide.

When a microscope slide in accordance with the present invention is used in an automatic feed mechanism, the specimens on the microscope slides may be successively examined without readjusting the microscope lenses.

The present invention thus provides a microscope slide which is effective in use and reduces the amount of time for adjusting the microscope than heretofore required. The microscope slide in accordance with the present invention may be easily constructed and will withstand more abuse than previous microscope slides due to the plastic construction of body 12.

I claim:

1. A microscope slide adapted to be supported on a microscope, which microscope has a substage lens and an objective lens, said slide comprising a generally flat elongated body having a lower surface and an upper surface spaced from said lower surface; a recess in said lower surface; a transparent cover plate mounted to said body in said recess having a first surface and a second surface, said second surface lying between said upper and lower surfaces of said body, said first surface being below said second surface and providing a support for a specimen whose image is to be projected, said first surface being adapted to be positioned in a reference plane of the microscope, and said first surface defining a focal plane upon which the objective and substage lenses may be focused, said second surface being spaced from said first surface by a distance no greater than the focal length of the objective lens; and an open passage between said upper surface and said recess to permit access of the objective lens to focus on the first surface of the cover plate, whereby upon positioning said first surface in a reference plane of said microscope, said microscope may be adjusted so that a substage radiation-projecting lens and an objective lens are focused on the focal plane and said focal plane is coincident with the reference plane, said recess being larger than said open passage to provide a flat peripheral shoulder in said recess, securing means securing said cover plate against said shoulder within said recess, the edges of said cover plate being spaced from the sidewalls of said recess, whereby said body may be flexed without breakage of said cover plate.

2. Apparatus according to claim 1 wherein said securing means comprises spaced, flexible, nonhardening bonding means supported by said shoulder to bond said cover plate to said shoulder.

3. Apparatus according to claim 2 wherein both said first and said second surfaces of said cover plate lie between said upper and lower surfaces of said body.

4. Apparatus according to claim 1 wherein both said first and said second surfaces of said cover plate lie between said upper and lower surfaces of said body.

5. Apparatus according to claim 4 wherein said securing means comprises an overhanging portion integral with said body and extending into said recess adjacent said first surface, said overhanging portion being so sized relative to said cover plate as to retain said coverplate in said recess.

* * * * *